No. 797,955. PATENTED AUG. 22, 1905.
H. L. HAPPER.
COFFEE AND TEA POT COVER.
APPLICATION FILED SEPT. 27, 1904.

2 SHEETS—SHEET 1.

Y-Y

X-X

WITNESSES

INVENTOR
HERVEY L. HAPPER
BY Paul Paul
HIS ATTORNEY

No. 797,955. PATENTED AUG. 22, 1905.
H. L. HAPPER.
COFFEE AND TEA POT COVER.
APPLICATION FILED SEPT. 27, 1904.
2 SHEETS—SHEET 2.
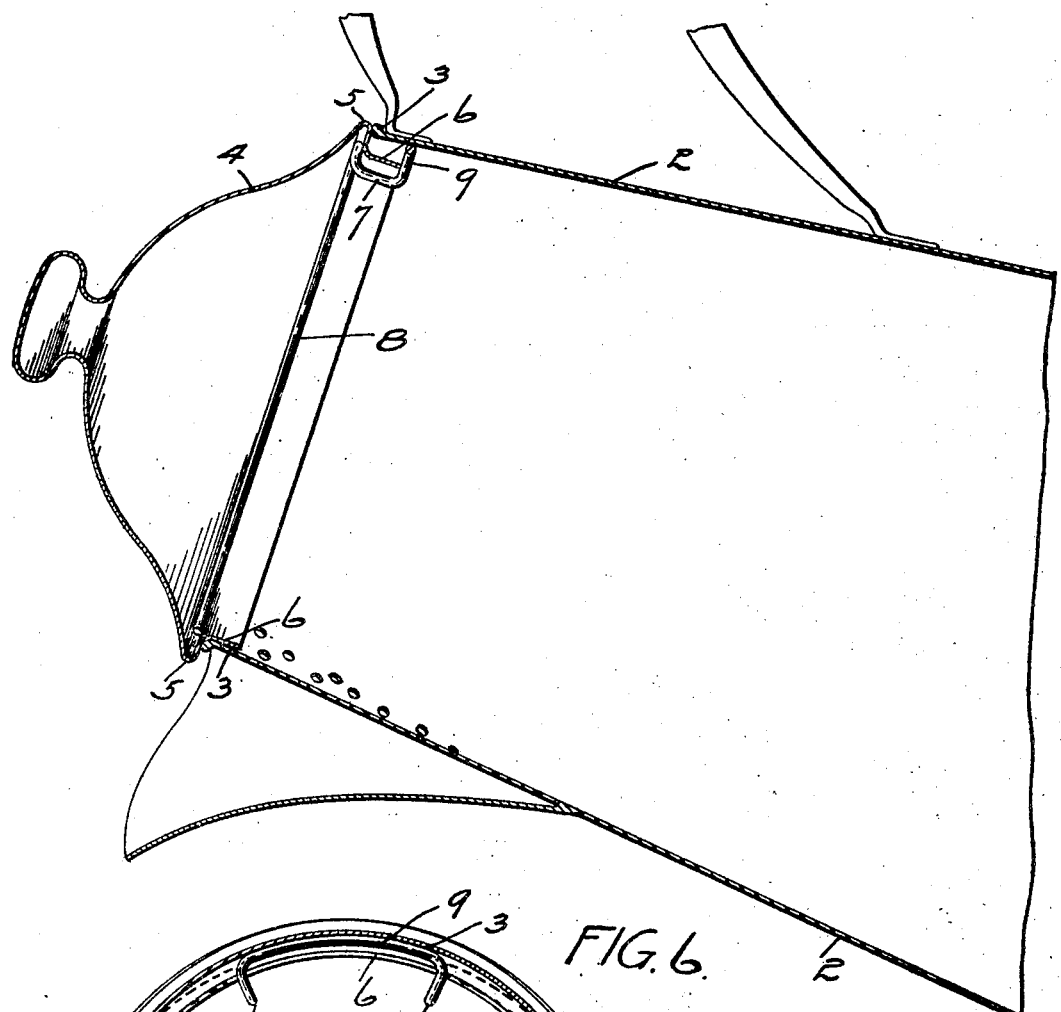
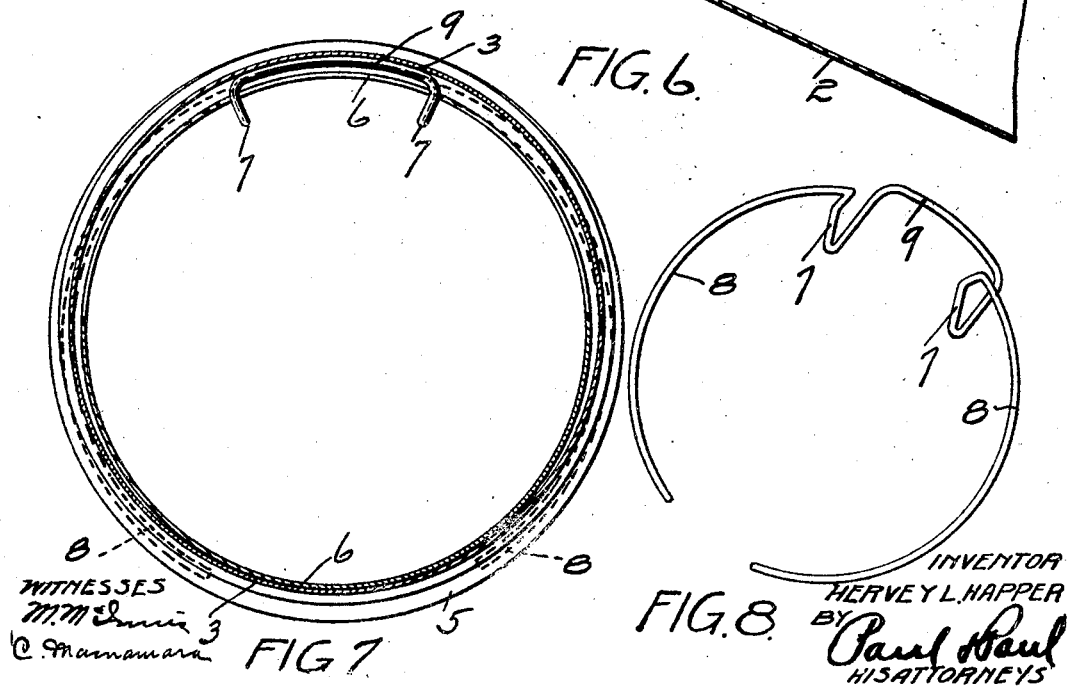

UNITED STATES PATENT OFFICE.

HERVEY L. HAPPER, OF MINNEAPOLIS, MINNESOTA.

COFFEE AND TEA POT COVER.

No. 797,955.     Specification of Letters Patent.     Patented Aug. 22, 1905.

Application filed September 27, 1904. Serial No. 226,111.

*To all whom it may concern:*

Be it known that I, HERVEY L. HAPPER, of Minneapolis, Hennepin county, Minnesota, have invented certain new and useful Improvements in Coffee and Tea Pot Covers, of which the following is a specification.

My invention relates to tin and enameled-ware vessels; and the primary object of the invention is to provide means to prevent the cover of a coffee or tea kettle or like article from falling off when the vessel is tilted to pour out its contents.

A further object is to provide a retaining device for the cover designed particularly for use on enameled ware which will be invisible when the cover is in place on the vessel, and hence will not in any way detract from the ornamental appearance of the article.

A further object is to provide a retaining device which can be easily applied to a cover after its completion and as readily removed at any time without in any way breaking or marring the enamel.

The invention consists generally in a spring-clip device adapted to fit within a cover and spring out against the wall thereof and having a part extending outwardly to a point near the circumference of the cover to engage the inner surface of the vessel-wall and hold the cover in place thereon when the vessel is tilted.

Further, the invention consists in various constructions and combinations, all as hereinafter described, and particularly pointed out in the claims.

Figure 1:
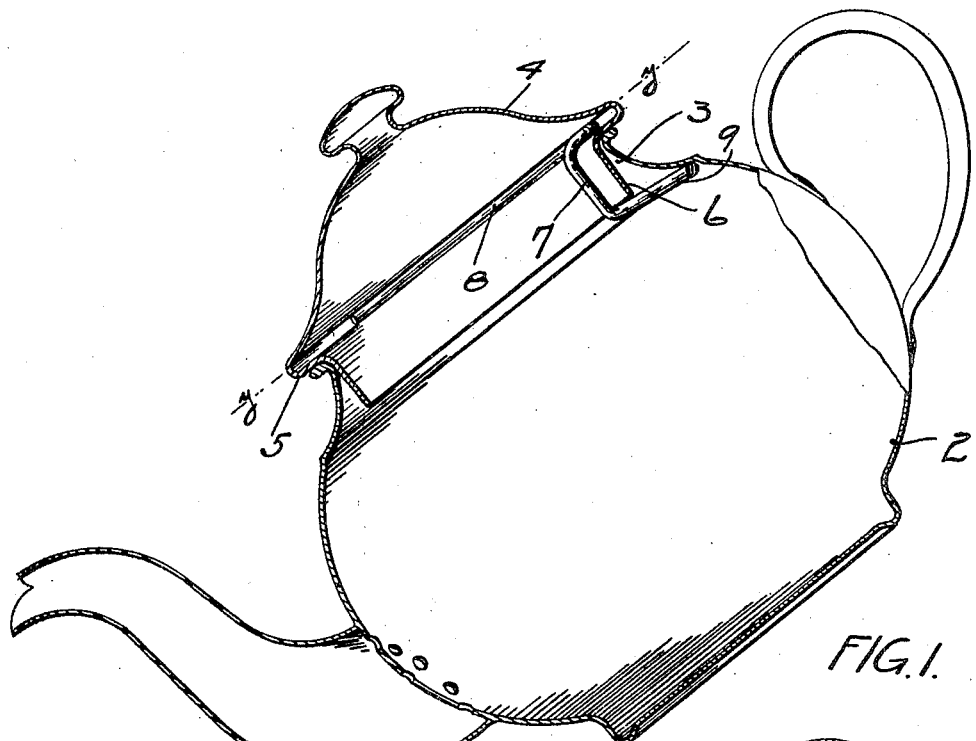
Figure 5:
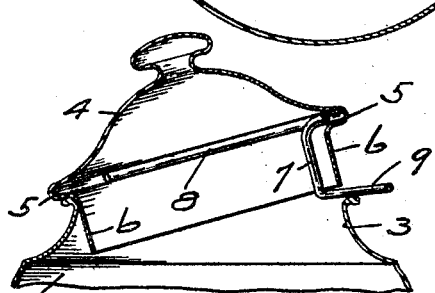
Figure 2:
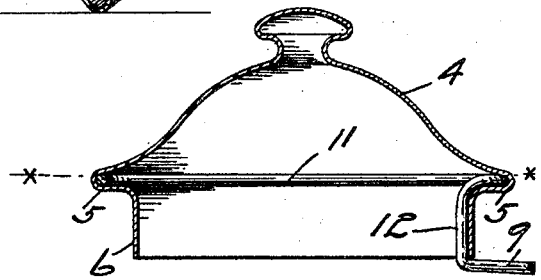
Figure 4:
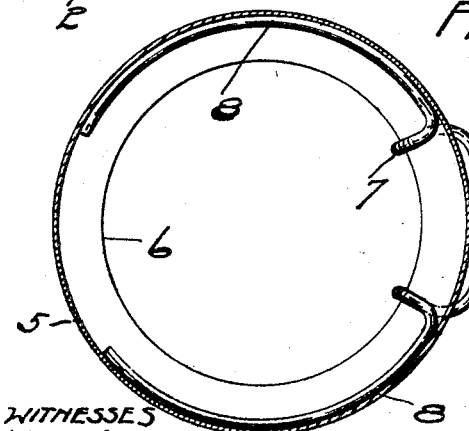
Figure 3:
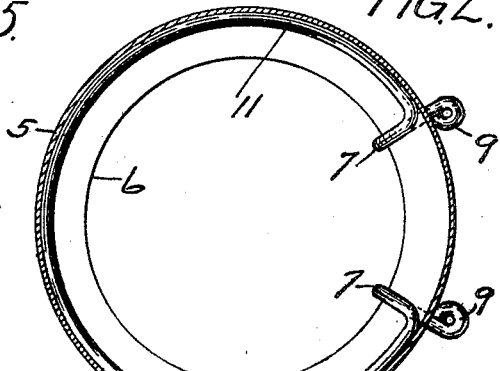

In the accompanying drawings, forming part of this specification, Figure 1 is a vertical sectional view of a teapot with the cover in place thereon, showing my improved retaining device. Fig. 2 is a vertical sectional view of a covering, showing a modified form of a retaining device. Fig. 3 is a horizontal sectional view on the line *x x* of Fig. 2. Fig. 4 is a horizontal sectional view on the line *y y* of Fig. 1. Fig. 5 illustrates the upper portion of the teapot in a horizontal position with the cover arranged to allow the escape of steam. Fig. 6 illustrates the application of the invention to a coffee-pot having straight walls. Fig. 7 is a horizontal section showing the manner of inserting the spring-retaining device into the cover, and Fig. 8 is a view of the spring-retaining device.

In the drawings, 2 represents an enameled-ware teapot having the opening 3 in its top, provided with the cover 4, having a horizontal flange 5 and a vertical flange 6 fitting within the opening 3 in the usual way. In tilting the pot there is always danger of the cover dropping off and allowing the steam to rush out and scald the hand of the person holding the vessel. The cover dropping upon the floor or table is frequently bent or broken, and the constant falling of the cover whenever the vessel is tilted to pour out its contents is always a source of great annoyance to the person using it. To obviate this objection to the use of vessels of this kind, particularly those of enamel-ware, to which a retaining device cannot be secured in any practicable way, I provide a clip 7, preferably of spring-wire, having arms 8, that fly out and engage the wall of the cover and hold the clip in place, and a looped part 9, that extends down around the lower edge of the vertical flange 6 and projects outwardly therefrom in a horizontal direction to engage the inner surface of the vessel-wall and hold the cover in place when the vessel is tilted. This retaining device is made of wire of suitable gage to prevent its being easily bent and is readily slipped into the cover and has sufficient tension to prevent any possibility of its becoming accidentally dislodged.

The looped portion of the wire engaging the wall of the pot when the cover is placed thereon is pressed inwardly and put under sufficient tension to force the vertical flange 6 against the opposite side of the pot and prevent any possibility of the cover slipping off when the pot is tilted. This feature of the invention renders it unnecessary, when putting on the cover, to always have the retaining device on the side of the pot next the handle. It may be on the side adjacent to the spout or at any point between the spout and handle and the result will be the same. The spring will press the vertical flange on the cover against the wall of the pot on the opposite side and hold it securely when the pot is tilted. As shown in Fig. 5, the looped part 9 may be utilized to support one edge of the cover in a tilted position to allow the escape of steam from the vessel. This feature of the device will be particularly valuable on a tea-kettle.

In Figs. 2 and 3 I have shown a modification in the construction of the device which consists in providing a spring-loop 11 fitting within the cover and extending nearly around the circumference of the same and provided with arms 12, that are downwardly turned parallel with the vertical flange 6 and outwardly bent at their lower ends beneath the edge of said vertical flange and extended to a point beyond the circumference of the cover. The ends of these arms are looped and adapted to engage the wall of the vessel and have the same function as the looped portion 9 of the device shown in Fig. 1.

I have shown my invention applied to a tea and coffee pot, but do not confine myself to this application of the device, as it is capable of use on kettles and pots of various kinds and sizes where a loose cover is used having a vertical flange that fits within the opening in the top of the vessel.

I claim as my invention—

1. The combination, with an enameled or pottery vessel having an opening in its top and a flanged cover therefor, of a retaining device of spring material fitting within said cover and held in place therein by its own tension and having a part that engages the inner surface of said vessel and holds the cover in place thereon when the vessel is tilted.

2. The combination, with a vessel and its cover having a vertical flange, of a retaining device of spring material having its ends within said cover, and a looped middle portion that projects below and beyond said flange and bears when in use upon the inner surface of the vessel with a yielding pressure and forces the said flange on the opposite side of the cover against the wall of the vessel to hold the cover thereon when the vessel is tilted.

3. The combination, with a teapot and its cover, having horizontal and vertical flanges, the latter fitting within the opening in the top of the pot, of a retaining device of spring material having ends removably fitting within said cover adapted to spring out and bear upon the wall thereof, the middle portion of said device being looped and bent down around the lower edge of said vertical flange and extended horizontally therefrom to a point near the circumference of said cover, and adapted to bear with a yielding pressure upon the inside wall of the pot, substantially as described and for the purpose specified.

4. The combination, with an enameled-ware vessel having an opening in its top and a flanged cover, of a retaining device of spring material removably fitting within said cover and held therein by its own tension, said device having a looped part that projects below and beyond said flange and is adapted to bear with a yielding pressure upon the wall of the vessel and prevent the cover from becoming accidentally detached therefrom, substantially as described.

5. The combination, with a vessel having an opening in its top and a flanged cover therefor, of a retaining device of spring material fitting within said cover and held in place therein by its own tension but readily removable and having a part that bears with a yielding pressure on the inner wall of said vessel to hold the cover in place thereon when the vessel is tilted.

In witness whereof I have hereunto set my hand, this 19th day of September, 1904, at Minneapolis, Minnesota.

HERVEY L. HAPPER.

In presence of—
RICHARD PAUL,
C. MACNAMARA.